United States Patent
Kim

(12) United States Patent (Kim)

(10) Patent No.: US 8,259,049 B2
(45) Date of Patent: *Sep. 4, 2012

(54) LIQUID CRYSTAL DISPLAY

(75) Inventor: Dong-kyu Kim, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/976,513

(22) Filed: Dec. 22, 2010

(65) Prior Publication Data

US 2011/0090140 A1 Apr. 21, 2011

Related U.S. Application Data

(63) Continuation of application No. 11/444,185, filed on May 31, 2006, now Pat. No. 7,872,622.

(30) Foreign Application Priority Data

Jul. 20, 2005 (KR) ................... 10-2005-0066014

(51) Int. Cl.
*G09G 3/36* (2006.01)
*G02F 1/1343* (2006.01)
*G02F 1/1337* (2006.01)
*G02F 1/1339* (2006.01)

(52) U.S. Cl. ............ 345/87; 345/92; 349/38; 349/129; 349/139; 349/155

(58) Field of Classification Search ............ 345/55, 345/84, 87, 90, 92
See application file for complete search history.

(56) References Cited

U.S. PATENT DOCUMENTS

| | | | | |
|---|---|---|---|---|
| 6,816,220 B2 * | 11/2004 | Baek et al. | ...................... | 349/139 |
| 6,952,247 B2 * | 10/2005 | Song et al. | ...................... | 349/113 |
| 7,119,870 B1 * | 10/2006 | Nishikawa et al. | ............ | 349/125 |
| 7,872,622 B2 * | 1/2011 | Kim | .................. | 345/87 |
| 2005/0140908 A1 * | 6/2005 | Song | .............................. | 349/146 |
| 2005/0231671 A1 * | 10/2005 | Jun et al. | ........................ | 349/139 |

FOREIGN PATENT DOCUMENTS

| | | |
|---|---|---|
| KR | 1020040001687 | 1/2004 |
| KR | 1020040107217 A | 12/2004 |

* cited by examiner

*Primary Examiner* — Alexander S Beck
*Assistant Examiner* — Charles V Hicks
(74) *Attorney, Agent, or Firm* — F. Chau & Associates, LLC.

(57) ABSTRACT

A liquid crystal display (LCD) which can provide uniform vertical and horizontal visibility while improving lateral visibility is provided. The LCD includes a first insulating substrate, first and second gate lines which are formed on the first insulating substrate, and a data line which is insulated from the first and second gate lines and intersects the first and second gate lines. The LCD also includes first and second thin film transistors (TFTs) which are formed in each pixel and are connected to the first and second gate lines, respectively, and to the data line, first sub-pixel electrodes which are connected to the first TFT, and a second sub-pixel electrode which is separated from the first sub-pixel electrodes by predetermined gaps and is connected to the second TFT. The LCD includes a second insulating substrate which faces the first insulating substrate, a common electrode which is formed on the second insulating substrate and comprises a plurality of domain dividers, and a liquid crystal layer which is interposed between the first and second insulating substrates, wherein a display region of the second sub-pixel electrode is divided into 4 domain groups by the domain dividers, and the 4 domain groups have substantially the same area.

23 Claims, 11 Drawing Sheets

LIQUID CRYSTAL DISPLAY

CROSS-REFERENCE TO RELATED APPLICATION

This application is a Continuation Application of U.S. patent application Ser. No. 11/444,185, filed May 31, 2006, now U.S. Pat. 7,872,622 which claims priority from Korean Patent Application No. 10-2005-0066014 filed on Jul. 20, 2005 in the Korean Intellectual Property Office, the disclosures of which are incorporated herein by reference in their entirety.

BACKGROUND OF THE INVENTION

1. Technical Field

The present disclosure relates to a display device, and more particularly, to a liquid crystal display (LCD).

2. Discussion of the Related Art

A liquid crystal display (LCD) is one of the most widely used flat panel displays. An LCD includes two panels provided with field-generating electrodes such as pixel electrodes and a common electrode and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

Among the LCDs, a vertical alignment (VA) mode LCD, which aligns LC molecules such that the long axes of the LC molecules are perpendicular to the panels in the absence of an electric field, exhibits a high contrast ratio and wide reference viewing angle. The reference viewing angle is defined as a viewing angle resulting in a contrast ratio equal to 1:10 or as a limit angle for the inversion in luminance between the grays.

The wide viewing angle of the VA mode LCD can be realized through the use of cutouts in the field-generating electrodes and/or protrusions on the field-generating electrodes. Since the cutouts and the protrusions influence the tilt directions of the LC molecules, the tilt directions can be distributed into several directions by using the cutouts and the protrusions such that the reference viewing angle is widened.

However, the VA mode LCD has relatively poor lateral visibility compared with front visibility. For example, a patterned VA (PVA) mode LCD having the cutouts can result in an image that becomes bright as a viewer moves away from the front vantage point, and in the worse case, the luminance difference between high grays vanishes such that the images cannot be perceived.

In addition, in LCDs, a pixel region is divided into a plurality of domains by cutouts or protrusions formed in or on a pixel electrode and a common electrode. However, the domains are likely to have different areas, and thus, it is difficult to provide uniform vertical and horizontal visibility.

SUMMARY OF THE INVENTION

Embodiments of the present invention provide an LCD which can provide uniform vertical and horizontal visibility while improving lateral visibility.

According to an embodiment of the present invention, there is provided a liquid crystal display (LCD) including a first insulating substrate, first and second gate lines which are formed on the first insulating substrate, a data line which is insulated from the first and second gate lines and intersects the first and second gate lines, first and second thin film transistors (TFTs) which are formed in each pixel and are connected to the first and second gate lines, respectively, and to the data line, first sub-pixel electrodes which are connected to the first TFT, a second sub-pixel electrode which is separated from the first sub-pixel electrodes by predetermined gaps and is connected to the second TFT, a second insulating substrate which faces the first insulating substrate, a common electrode which is formed on the second insulating substrate and comprises a plurality of domain dividers, and a liquid crystal layer which is interposed between the first and second insulating substrates, wherein a display region of the second sub-pixel electrode is divided into 4 domain groups by the domain dividers, and the 4 domain groups have substantially the same area.

According to another embodiment of the present invention, a liquid crystal display (LCD) device comprises a first substrate, a first gate line and a second gate line formed on the first substrate, a data line intersecting the first and second gate lines, a first thin film transistor and a second thin film transistor formed in each pixel of a plurality of pixels and connected to the first and second gate lines, respectively, and to the data line, a first sub-pixel electrode connected to the first thin film transistor, a second sub-pixel electrode separated from the first sub-pixel electrode by a predetermined gap and connected to the second thin film transistor, a second substrate facing the first substrate, and a common electrode formed on the second substrate and comprising a plurality of domain dividers, wherein a display region of the second sub-pixel electrode is divided into a plurality of domain groups according to a shape of the second sub-pixel electrode and the domain dividers, and each of the plurality of domain groups have substantially the same area.

BRIEF DESCRIPTION OF THE DRAWINGS

Exemplary embodiments of the invention can be understood in more detail from the following descriptions taken in conjunction with the accompanying drawings in which.

DETAILED DESCRIPTION OF THE EXEMPLARY EMBODIMENTS

Exemplary embodiments of the present invention will be described below in more detail with reference to the accompanying drawings. The present invention may, however, be embodied in many different forms and should not be construed as being limited to the embodiments set forth herein.

Figure 1A:
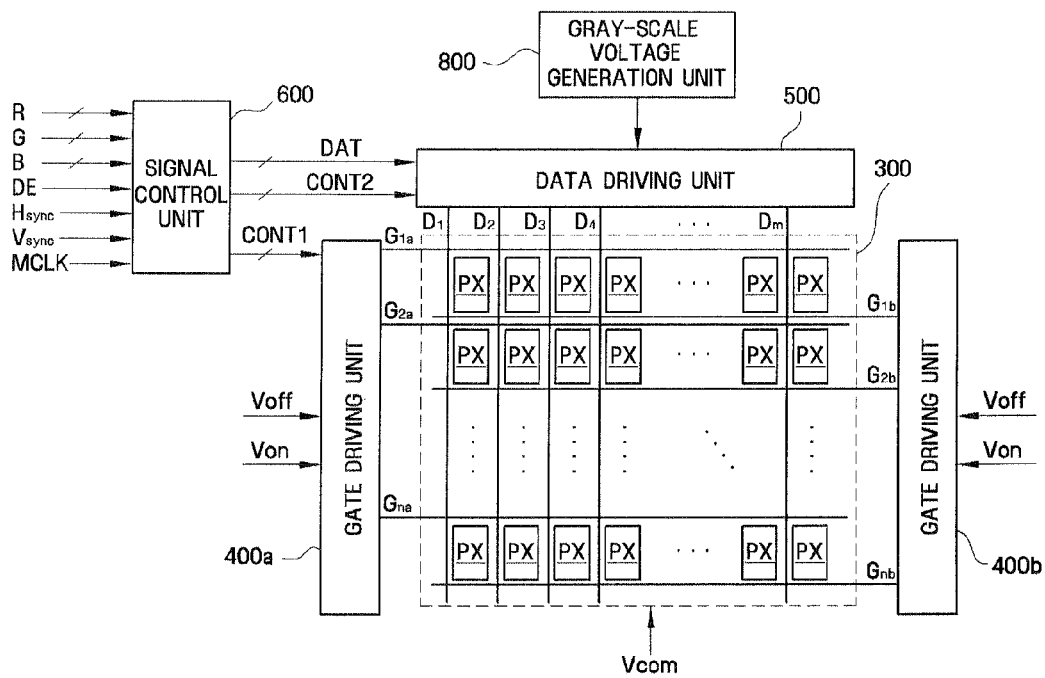
FIGS. 1A through 1C are block diagrams of an LCD according to an exemplary embodiment of the present invention.
Figure 1B:
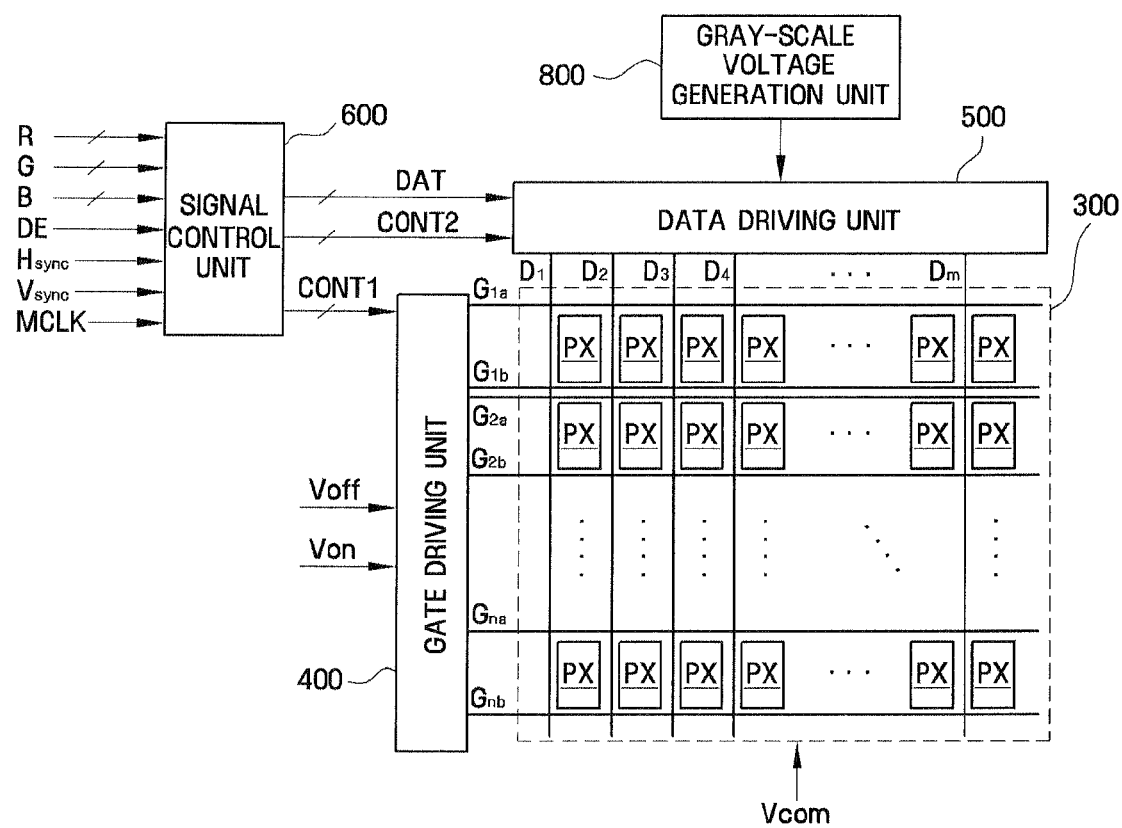
Figure 1C:
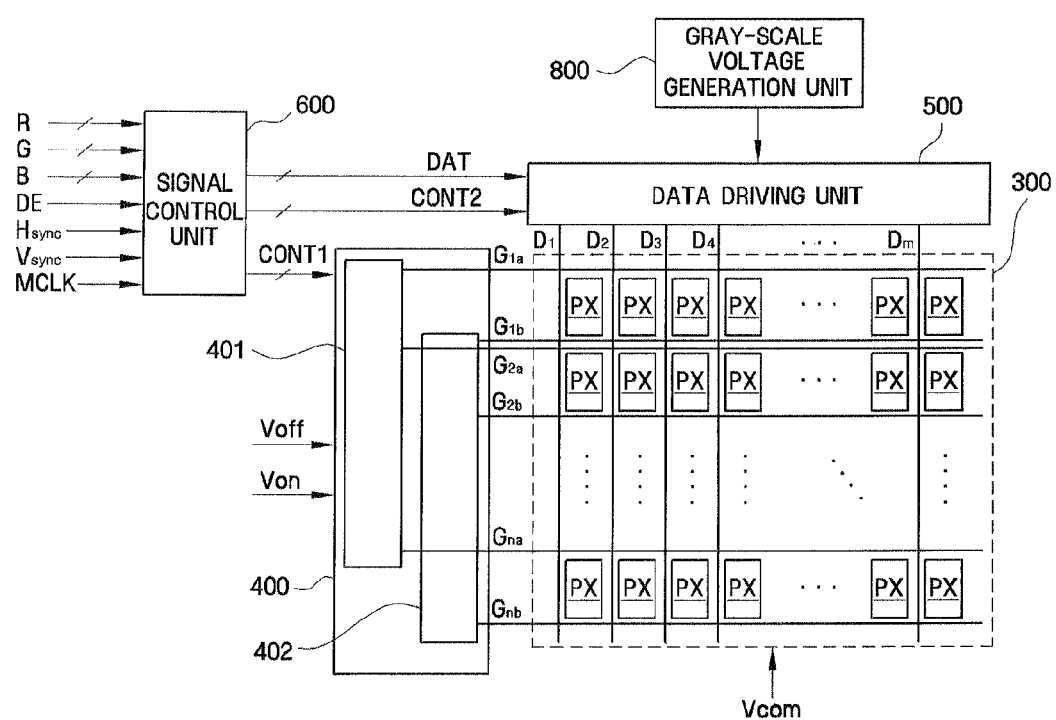
Figure 2:
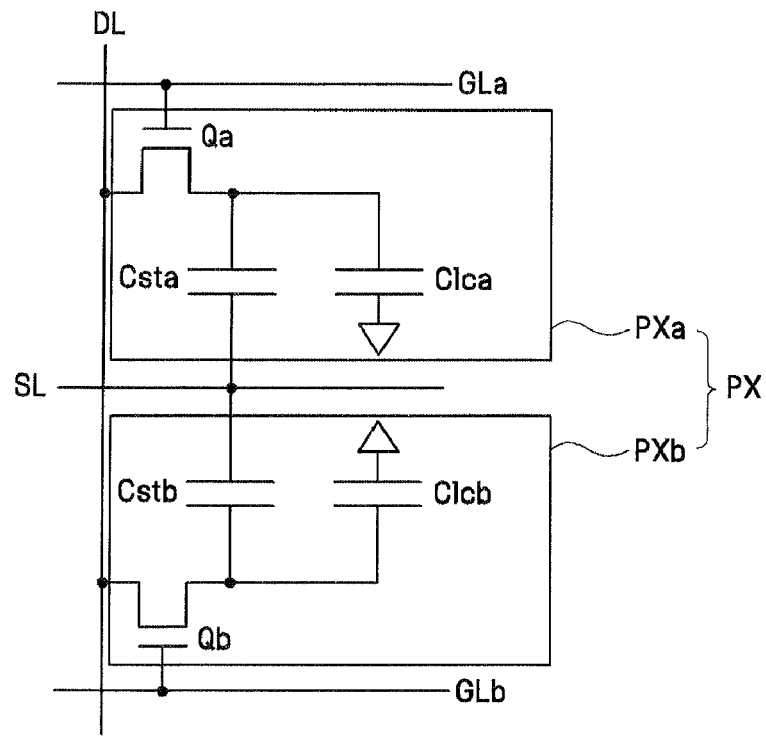
FIG. 2 is an equivalent circuit diagram of a pixel of an LCD according to an exemplary embodiment of the present invention.
Figure 3:
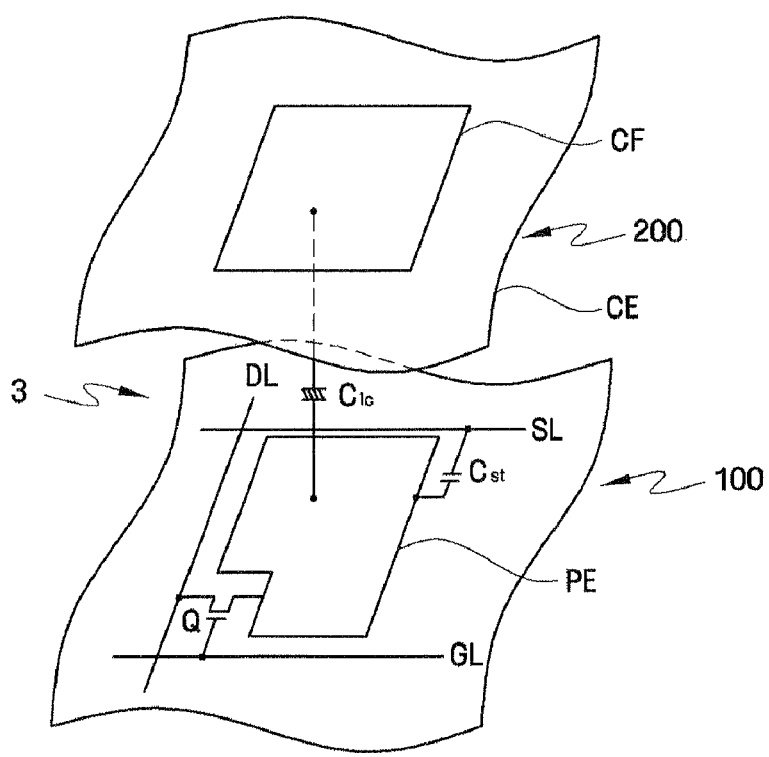
FIG. 3 is an equivalent circuit diagram of a sub-pixel of an LCD according to an exemplary embodiment of the present invention.

FIGS. 1A through 1C are block diagrams of an LCD according to an exemplary embodiment of the present invention. FIG. 2 is an equivalent circuit diagram of a pixel of an LCD according to an exemplary embodiment of the present invention. FIG. 3 is an equivalent circuit diagram of a sub-pixel of an LCD according to an exemplary embodiment of the present invention.

Referring to FIGS. 1A through 1C, an LCD according to an exemplary embodiment of the present invention includes a liquid crystal panel assembly 300, a data driving unit 500 and a gate driving unit 400 (or a pair of gate driving units 400a and 400b) which are connected to the liquid crystal panel assembly 300. A gray-scale voltage generation unit 800 is connected to the data driving unit 500. A signal control unit 600 controls the gate driving unit 400 (or the gate driving units 400a and 400b) and the data driving unit 500.

The liquid crystal panel assembly 300 includes a plurality of display signal lines and a plurality of pixels PX which are connected to the display signal lines and are arranged in a matrix format. Referring to FIG. 3, the liquid crystal panel assembly 300 may include a lower display panel 100 and an upper display panel 200 which face each other and a liquid crystal layer 3 which is interposed between the lower and upper display panels 100 and 200.

The display signal lines are formed on the lower display panel 100 and include a plurality of gate lines $G_{1a}$ through $G_{na}$ and $G_{1b}$ through $G_{nb}$, which transmit gate signals, and a plurality of data signals $D_1$ through $D_m$ which transmit data signals. The gate lines $G_{1a}$ through $G_{na}$ and $G_{1b}$ through $G_{nb}$ substantially extend in a transverse direction and are parallel to one another, while the data lines $D_1$ through $D_m$ substantially extend in a longitudinal direction and are parallel to one another.

FIG. 2 is an equivalent circuit diagram of a pixel PX of an LCD according to an exemplary embodiment of the present invention including gate lines GLa and GLb, a data line DL, and a storage electrode line SL, which is substantially parallel to the gate lines GLa and GLb.

Referring to FIG. 2, the pixel PX comprises a pair of sub-pixels PXa and PXb. The sub-pixels PXa and PXb include switching devices Qa and Qb, respectively, liquid crystal capacitors Clca and Clcb, respectively, and storage capacitors Csta and Cstb, respectively. The switching devices Qa and Qb are connected to the gate lines GLa and GLb, respectively, and are connected to the data line DL. The liquid crystal capacitors Clca and Clcb are connected to the switching devices Qa and Qb, respectively. The storage capacitors Csta and Cstb are connected to the switching devices Qa and Qb, respectively, and are connected to the storage electrode line SL. The pixel PX may optionally include the storage capacitors Csta and Cstb. If the pixel PX does not include the storage capacitors Csta and Cstb, the storage electrode line SL can be omitted.

Referring to FIG. 3, a switching device Q of a sub-pixel PE includes a thin film transistor (TFT) formed on the lower display panel 100 and is a three-end portion device including a control end portion connected to a gate line GL, an input end portion connected to a data line DL, and an output end portion connected to a liquid crystal capacitor $C_{lc}$ and a storage capacitor $C_{st}$.

The sub-pixel electrode PE of the lower display panel 100 and a common electrode CE of an upper display panel 200 function as two terminals of the liquid crystal capacitor $C_{lc}$, and the liquid crystal layer 3 interposed between the sub-pixel electrode PE and the common electrode CE serves as a dielectric material. The sub-pixel electrode PE is connected to the switching device Q. The common electrode CE is formed on a surface of the upper display panel 200, for example, a front surface, and a common voltage Vcom is applied to the common electrode CE. The common electrode CE may be formed on the lower display panel 100, in which case, the sub-pixel electrode PE or the common electrode CE may be shaped as a line or a strip.

The storage capacitor $C_{st}$ is an auxiliary capacitor for the LC capacitor $C_{lc}$. The storage capacitor $C_{st}$ includes the pixel electrode PE and a separate signal line (not shown), which is provided on the lower panel 100. The separate signal line overlaps the pixel electrode PE via an insulator, and is supplied with a predetermined voltage such as the common voltage Vcom. Alternatively, the storage capacitor $C_{st}$ includes the pixel electrode PE and an adjacent gate line called a previous gate line, which overlaps the pixel electrode PE via an insulator.

For a color display, each pixel represents one of three primary colors such as red, green and blue (R, G and B) colors (spatial division) or sequentially represents the three primary colors in time (temporal division), so as to obtain a desired color. FIG. 3 shows an example of the spatial division in which each pixel includes a color filter CF representing one of the three primary colors in an area of the upper panel 200. The color filter CF may also be provided on or under the pixel electrode PE of the lower panel 100.

Referring to FIGS. 1A through 1C, the gate driving unit 400 (or the gate driving units 400a and 400b) is connected to the gate lines $G_{1a}$ through $G_{na}$ and $G_{1b}$ through $G_{nb}$ and applies gate signals consisting of a gate-on voltage Von and a gate-off voltage Voff applied from an external circuit to the gate lines $G_{1a}$ through $G_{na}$ and $G_{1b}$ through $G_{nb}$. In detail, referring to FIG. 1A, the gate driving units 400a and 400b are located on the left and right sides, respectively, of the liquid crystal panel assembly 300 and are connected to the odd-numbered gate lines $G_{1a}$ through $G_{na}$ and the even-numbered gate lines $G_{1b}$ through $G_{nb}$, respectively. Referring to FIGS. 1B and 1C, the gate driving unit 400 is located on one side of the liquid crystal panel assembly 300 and is connected to all of the gate lines $G_{1a}$ through $G_{na}$ and $G_{1b}$ through $G_{nb}$. Referring to FIG. 1C, the gate driving unit 400 includes two driving circuits 401 and 402 which are connected to the odd-numbered gate lines and the even-numbered gate lines, respectively.

The gray-scale voltage generation unit 800 generates two sets of gray-scale voltages (or reference gray-scale voltage sets) which are related to the transparencies of the pixels PX. The two gray-scale voltage sets are independently provided to a pair of sub-pixels of each pixel PX. Each of the two gray-scale voltage sets includes positive polarity level and negative polarity level with respect to the common voltage Vcom, but the embodiments of the present invention are not restricted thereto. Alternatively, the gray-scale voltage generation unit 800 may generate only one gray-scale voltage set, rather than generating two gray-scale voltage sets.

The data driving unit 500 is connected to the data lines $D_1$ through $D_m$ of the liquid crystal panel assembly 300, selects one of the two gray-scale voltage sets generated by the gray-scale voltage generation unit 800, and applies one of a plurality of gray-scale voltages included in the selected gray-scale voltage set to the pixels PX as a data voltage. If the gray-scale voltage generation unit 800 provides only a reference gray-scale voltage, instead of providing a set of voltages for all gray scales, the data driving unit 500 generates a plurality of reference voltages for all gray scales by dividing the reference gray scale and selects one of the reference voltages as a data voltage.

The gate driving unit 400 (or the gate driving units 400a and 400b) and/or the data driving unit 500 may be formed as an integrated chip on which a plurality of driving circuits are integrated. The gate driving unit 400 (or the gate driving units 400a and 400b) and/or the data driving unit 500 may be directly mounted on the liquid crystal panel assembly 300. Alternatively, the gate driving unit 400 (or the gate driving units 400a and 400b) and/or the data driving unit 500 may be mounted on a flexible printed circuit film (not shown), and then the resulting structure may be mounted on the liquid crystal panel assembly 300 as a tape carrier package. Alternatively, the gate driving unit 400 (or the gate driving units 400a and 400b) and/or the data driving unit 500 may be integrated on the liquid crystal panel assembly 300 together with the display signal lines $G_{1a}$ through $G_{na}$, $G_{1b}$ through $G_{nb}$ and $D_1$ through $D_m$ and a switching device Q of a TFT.

The signal control unit 600 controls the gate driving unit 400 (or the gate driving units 400a and 400b) and the data driving unit 500.

LCDs according to exemplary embodiments of the present invention will now be described in detail with reference to FIGS. 4A through 7.

First, FIGS. 4A through 4C and 5 are diagrams illustrating an LCD according to an exemplary embodiment of the present invention. The LCD includes a lower display panel, an upper display panel, which faces the lower display panel, and a liquid crystal layer which is interposed between the lower and upper display panels.

A lower display panel of the LCD according to an exemplary embodiment of the present invention will now be described in detail with reference to FIGS. 4A through 4C.

Figure 4A:
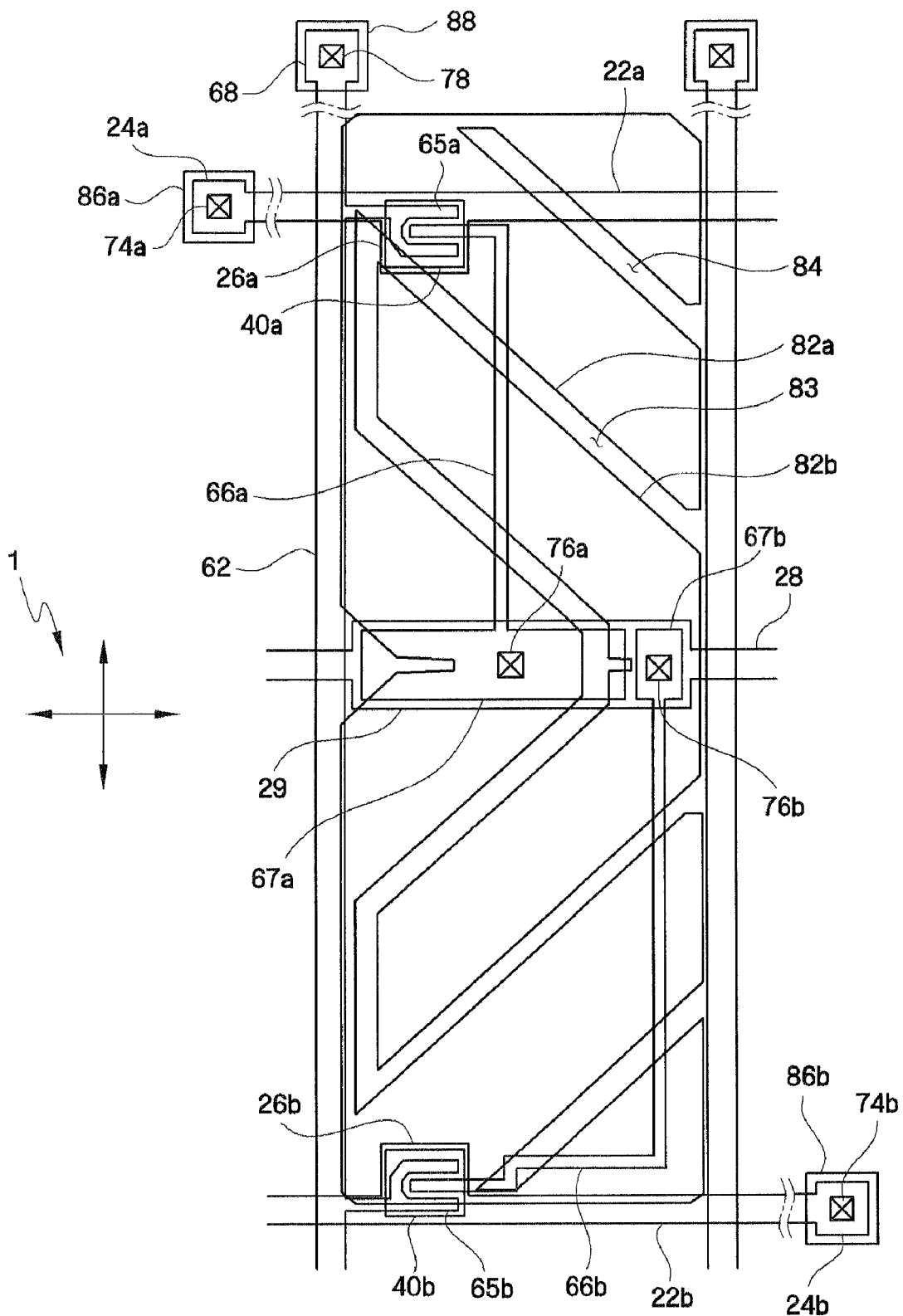
FIG. 4A is a layout view of a lower display panel of an LCD according to an exemplary embodiment of the present invention.
Figure 4B:
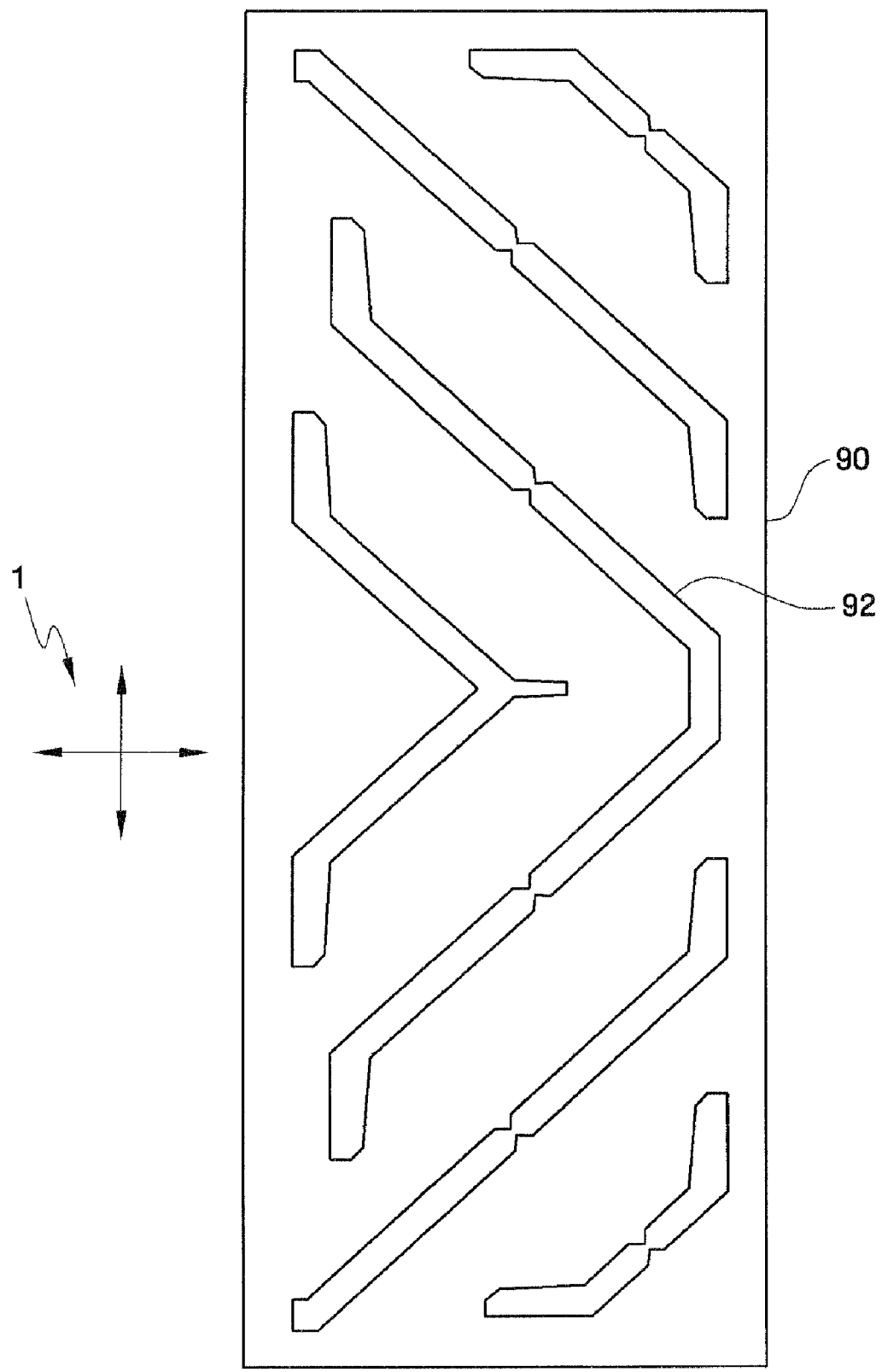
FIG. 4B is a layout view of an upper display panel of an LCD according to an exemplary embodiment of the present invention.
Figure 4C:
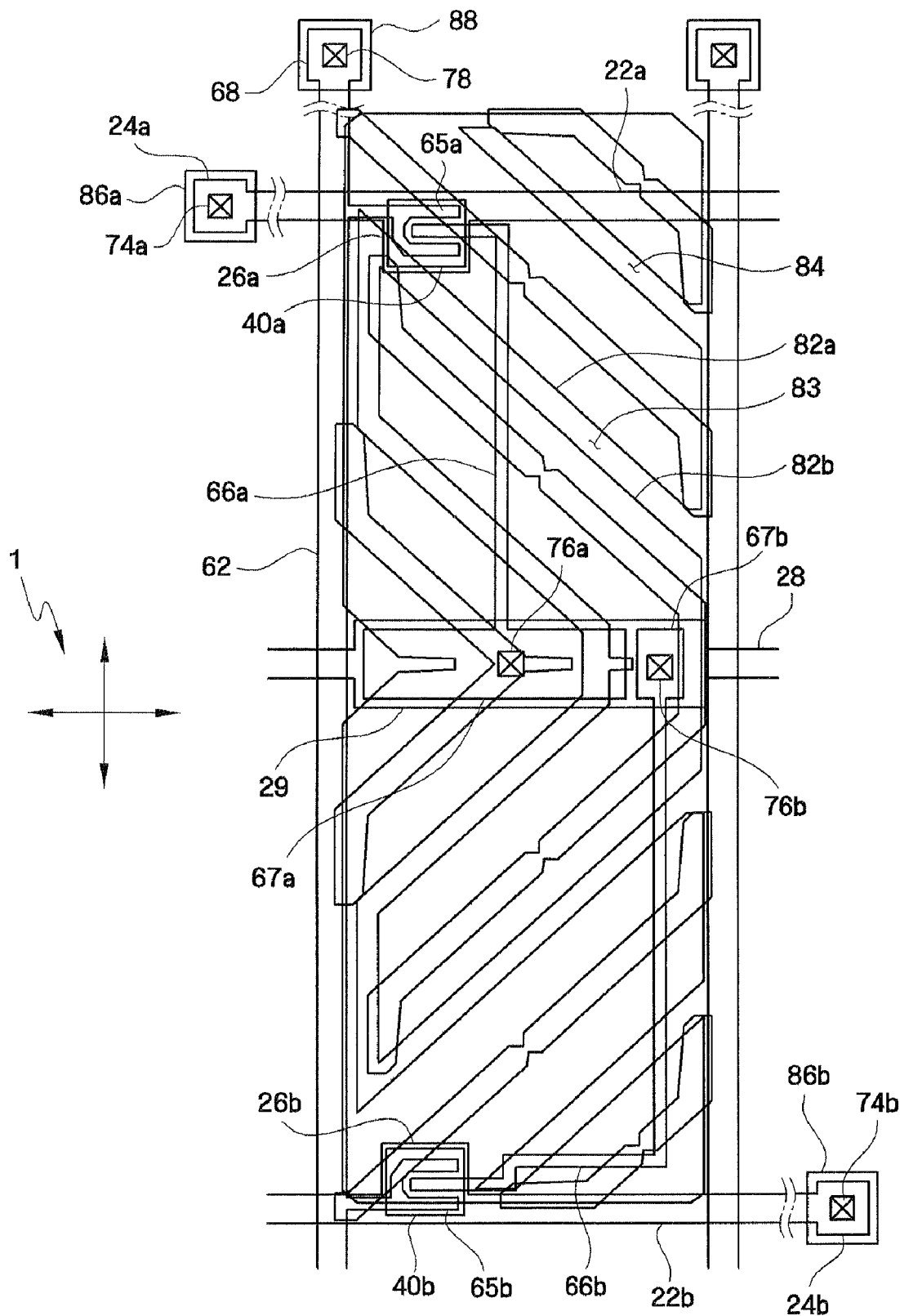
FIG. 4C is a layout view of an LCD including the display panel of FIG. 4A and the display panel of FIG. 4B according to an exemplary embodiment of the present invention.

Referring to FIGS. 4A through 4C, a pair of gate lines, e.g., first and second gate lines 22a and 22b, and a storage electrode line 28, are formed on an insulating substrate, which is formed of a transparent material, such as glass.

The first and second gate lines 22a and 22b extend substantially in a transverse direction to transmit gate signals and are physically and electrically spaced apart from each other. The first and second gate lines 22a and 22b are located on opposite sides of a pixel, for example, the upper and lower sides, respectively, of a pixel. A pair of electrodes, e.g., first and second gate electrodes 26a and 26b, are formed as branches of the first and second gate lines 22a and 22b, respectively. A first gate line end portion 24a is formed at one end of the first gate line 22a, and a second gate line end portion 24b is formed at one end of the second gate line 22b. The first and second gate line end portions 24a and 24b receive gate signals from another layer or from external circuits and transmit the gate signals to the first and second gate lines 22a and 22b, respectively. The first and second gate line end portions 24a and 24b are formed wider than the first and second gate lines 22a and 22b so as to effectively connect the first and second gate lines 22a and 22b to external circuits. The first and second gate line end portions 24a and 24b are located on the left and right sides, respectively, of a pixel region, as illustrated in FIG. 4A. Alternatively, for example, the first and second gate line end portions 24a and 24b may be all located on one side of a pixel region, for example, on either the left or right sides of the pixel region.

As shown in FIGS. 4A and 4C, the storage electrode line 28 extends along a horizontal direction. A storage electrode 29 is formed on the storage electrode line 28 and is wider than the storage electrode line 28. In the present embodiment, the storage electrode line 28 crosses the middle of the pixel region. The shapes and arrangement of the storage electrode line 28 and the storage electrode 29 may vary.

The first and second gate lines 22a and 22b and the storage electrode line 28 are preferably made of Al containing metal such as Al and Al alloy, Ag containing metal such as Ag and Ag alloy, Cu containing metal such as Cu and Cu alloy, Mo containing metal such as Mo and Mo alloy, Cr, Ti and/or Ta. In addition, the first and second gate lines 22a and 22b and the storage electrode line 28 may have a multi-layered structure including two conductive films (not shown) having different physical characteristics. One of the two conductive films is preferably made of a low resistivity metal including Al containing metal, Ag containing metal, and/or Cu containing metal for reducing signal delay or voltage drop in the first and second gate lines 22a and 22b and the storage electrode line 28. The other conductive film is preferably made of material such as a Mo containing metal, Cr, Ta and/or Ti, which have good physical, chemical, and electrical contact characteristics with other materials such as indium tin oxide (ITO) or indium zinc oxide (IZO). A good exemplary combination is a lower Cr film and an upper Al film or a lower Al film and an upper Mo film. However, the first and second gate lines 22a and 22b and the storage electrode line 28 may be made of various metals or conductors.

A gate insulation layer (not shown) formed of, for example, silicon nitride ($SiN_x$), is formed on the first and second gate lines 22a and 22b and the storage electrode line 28.

Semiconductor layers 40a and 40b formed of, for example, hydrogenated amorphous silicon or porous silicon, are formed on the gate insulation layer. The semiconductor layers 40a and 40b may have various shapes such as island shapes or line shapes. In an illustrative embodiment, for example, the semiconductor layers 40a and 40b may be formed in an island shape. When the semiconductor layers 40a and 40b are formed in a line shape, they may be disposed under the data line 62 and extended.

An ohmic contact layer (not shown) formed of, for example, silicide or n+ hydrogenated amorphous silicon doped with a high concentration of n-type impurities, is formed on the semiconductor layers 40a and 40b. Ohmic contacts are provided on the semiconductor layers 40a and 40b in pairs.

The data line 62 and first and second drain electrodes 66a and 66b are formed on the ohmic contact layer and the gate insulation layer.

The data line 62 extends substantially along a longitudinal direction, intersects the first and second gate lines 22a and 22b and the storage electrode line 28, and transmits a data voltage. First and second source electrodes 65a and 65b are formed on the data line 62 and extend toward the first and second drain electrodes 66a and 66b, respectively. In addition, a data line end portion 68 is formed at one end of the data line 62. The data line end portion 68 receives a data signal from another layer or an external source and transmits the data signal to the data line 62. The data line end portion 68 is formed wider than the data line 62 so as to effectively connect the data line 62 to an external circuit.

The data line 62, the first and second source electrodes 65a and 65b and the first and second drain electrodes 66a and 66b are preferably made of refractory metal such as Cr, a metal containing Mo, Ta, and/or Ti. Also, the data line 62, the first and second source electrodes 65a and 65b and the first and second drain electrodes 66a and 66b may have a multilayered structure including a lower refractory metal film and a low-resistivity upper film (not shown). Examples of the multi-layered structure include a double-layered structure having an upper Cr film and an upper Al film or a lower Al film and an upper Mo film, and a triple-layered structure having a lower Mo film, an intermediate Al film, and an upper Mo film.

The first and second source electrodes 65a and 65b at least partially overlap the semiconductor layers 40a and 40b, respectively. The first and second drain electrodes 66a and 66b are opposite to and face the first and second source electrodes 65a and 65b, with respect to the gate electrodes 26a and 26b, respectively, and at least partially overlap with the semiconductor layers 40a and 40b, respectively. The ohmic contacts are interposed between the underlying semiconductor layers 40a, 40b and the overlying first and second source electrodes 65a, 65b and first and second drain electrodes 66a, 66b to reduce the contact resistance between semiconductor layers and the source and drain electrodes.

The first and second drain electrodes 66a and 66b include strip-type end portions overlapping with the semiconductor layers 40a and 40b. Drain electrode extensions 67a and 67b extend from the strip-type end portions, are wider than the strip-type end portions, and overlap the storage electrode 29.

Each of the first and second source electrodes 65a and 65b are separated into two branches and surround the strip-type end portions of the first and second drain electrodes 66a and 66b, respectively.

A passivation layer (not shown) is formed on the data line 62, the first and second drain electrodes 66a and 66b, and exposed portions of the semiconductor layers 40a and 40b. The passivation layer is preferably made of an inorganic insulator such as silicon nitride or silicon oxide, a flat photosensitive organic material, or a low dielectric insulating material such as a-Si:C:O and a-Si:O:F formed by plasma enhanced chemical vapor deposition (PECVD). In addition, the passivation layer may be formed as a double layer including a lower inorganic layer and an upper organic layer so as to provide organic layer characteristics and effectively protect the exposed portions of the semiconductor layers 40a and 40b.

Contact holes 78, 76a, and 76b are formed through the passivation layer so that the data line end portion 68 and the drain electrode extensions 67a and 67b can be exposed through the contact holes 78, 76a, and 76b, respectively. Contact holes 74a and 74b are formed through the passivation layer and the gate insulation layer so that the first and second gate line end portions 24a and 24b can be exposed through the contact holes 74a and 74b, respectively. First and second sub-pixel electrodes 82a and 82b are formed to be electrically connected to the first and second drain electrodes 66a and 66b, respectively, through the contact holes 76a and 76b, respectively. Auxiliary gate line end portions 86a and 86b and an auxiliary data line end portion 88 are formed on the passivation layer and are connected to the first and second gate line end portions 24a and 24b and the data line end portion 68, respectively, through the contact holes 74a, 74b, and 78, respectively. The first and second sub-pixel electrodes 82a and 82b and the auxiliary gate and data line end portions 86a, 86b, 88 are preferably made of a transparent conductor such as ITO or IZO and/or a reflective conductor such as Al.

The first and second sub-pixel electrodes 82a, 82b are physically and electrically connected to the first and second drain electrodes 66a, 66b through the contact holes 76a, 76b such that the first and second sub-pixel electrodes 82a, 82b receive the data voltages from the first and second drain electrodes 66a, 66b.

Electric fields are generated between the first and second sub-pixel electrodes 82a, 82b supplied with the data voltages and the common electrode of the upper display panel. The electric fields influence an orientation of liquid crystal molecules in the LC layer between the first and second sub-pixel electrodes 82a, 82b and the common electrode.

As described above, the first sub-pixel electrode 82a forms the liquid crystal capacitor Clca with the common electrode CE, and the second sub-pixel electrode 82b forms the liquid crystal capacitor Clcb with the common electrode CE. Accordingly, even after the switching devices Qa and Qb are turned off, the first and second sub-pixel electrodes 82a and 82b can maintain a predetermined voltage level.

In order to enhance storage capacity, the storage capacitor Csta and the liquid crystal capacitor Clca are connected in parallel to each other, and the storage capacitor Cstb and the liquid crystal capacitor Clcb are connected in parallel to each other. The storage capacitors Csta and Cstb are formed by arranging the first and second sub-pixel electrodes 82a and 82b or the first and second drain electrodes 66a and 66b connected to the first and second sub-pixel electrodes 82a and 82b, respectively, to overlap the storage electrode line 28.

The first and second sub-pixel electrodes 82a and 82b are separated from each other by gaps 83. The gaps 83 may have a rectangular shape. The second sub-pixel electrodes 82b are V-shaped and are located in the middle of a pixel region. The first sub-pixel electrodes 82a are formed in portions of the pixel region where the second sub-pixel electrode 82b is not formed. The gaps 83 include a gap that forms an angle of about 45 degrees with a transmission axis 1 of a polarizing plate and a gap that forms an angle of about −45 degrees with the transmission axis 1 of the polarizing plate. Therefore, upper oblique portions of the second sub-pixel electrode 82b form an angle of −45 degrees with the transmission axis 1 of the polarizing plate, and lower oblique portions of the second sub-pixel electrode 82b form an angle of 45 degrees with the transmission axis 1 of the polarizing plate. A plurality of cutouts 84 may be formed in the first sub-pixel electrodes 82a in the longitudinal directions of the respective gaps 83. Alternatively to, or in addition to the cutouts 84, a plurality of protrusions may be formed on the first sub-pixel electrodes 82a in the longitudinal directions of the respective gaps 83 (hereinafter referred to as oblique directions). The sizes and shapes of the first and second sub-pixel electrodes 82a and 82b and the cutouts 84 (or the protrusions) may vary in a variety of manners according to design factors.

Different gray-scale voltages are applied to the first and second sub-pixel electrodes 82a and 82b. For example, a gray-scale voltage which is lower than a reference gray-scale voltage may be applied to the first sub-pixel electrodes 82a, and a gray-scale voltage which is higher than the reference gray-scale voltage may be applied to the second sub-pixel electrode 82b. Assuming that a ratio of an area of the first sub-pixel electrodes 82a to an area of the second sub-pixel electrodes 82b is about 2:1, the lateral visibility of an LCD including the first and second sub-pixel electrodes 82a and 82b can be considerably improved by applying different gray-scale voltages to the first and second sub-pixel electrodes 82a and 82b in the above-described manner.

The auxiliary gate line end portions 86a and 86b and the data line end portion 88 are connected to the first and second gate line end portions 24a and 24b and the data line end portion 68, respectively, through the contact holes 74a, 74b, and 78, respectively. The auxiliary gate line end portions 86a and 86b and the data line end portion 88 are used for connecting external devices to the gate line end portions 24a and 24b and the data line end portion 68.

An alignment layer (not shown) for aligning a liquid crystal layer is formed on the first and second sub-pixel electrodes 82a and 82b, the auxiliary gate line end portions 86a and 86b, and the data line end portion 88.

An upper display panel of the LCD according to an exemplary embodiment of the present invention will now be described in detail with reference to FIGS. 4B and 4C.

Referring to FIGS. 4B and 4C, a black matrix (not shown), color filters (not shown), e.g., red, green, and blue filters, and a common electrode 90 are formed on an insulating substrate, which is formed of a transparent material, such as glass. The common electrode 90 is formed of a transparent material, such as ITO or IZO. The black matrix corresponds to the first and second gate lines 22a and 22b, the data line 62, and the switching devices Qa and Qb. The black matrix may be formed in various shapes. The black matrix prevents light leakage from occurring near the first and second sub-pixel electrodes 82a and 82b and the switching devices Qa and Qb.

The common electrode 90 corresponds to the first and second sub-pixel electrodes 82a and 82b and includes a plurality of cutouts 92 (and/or a plurality of protrusions). Here, the cutouts 92 (or the protrusions) comprise oblique portions which form an angle of −45 degrees or 45 degrees with the transmission axis 1 of the polarizing plate. As described above, the first and second sub-pixel electrodes 82a and 82b, like the common electrode 90, include the cutouts 84 (or the protrusions).

An alignment layer (not shown) for aligning a liquid crystal layer may be formed on the common electrode 90.

FIG. 4C is a layout view of an LCD including the lower display panel of FIG. 4A and the upper display panel of FIG. 4B. Referring to FIG. 4C, the oblique portions of the cutouts 92 of the common electrode 90 are arranged among the gaps 83 and the cutouts 84 (or the protrusions) of the first sub-pixel electrodes 82a. The relationship between the cutouts 92 of the common electrode 90 and the second sub-pixel electrode 82b will be described in detail with reference to FIG. 5.

An architecture for the LCD according to an exemplary embodiment of the present invention can be formed by vertically aligning the lower display panel of FIG. 4A and the upper display panel of FIG. 4B with each other and coupling them with liquid crystal material interposed therebetween. When the lower display panel of FIG. 4A and the upper display panel of FIG. 4B are vertically aligned with each other, a display region of a pixel is divided into a plurality of domains by the gaps 83, the cutouts 84 of the first sub-pixel electrodes 82a, and the cutouts 92 of the common electrode 90. As a result, a reference viewing angle is widened and lateral visibility is improved. The gaps and the cutouts 94 and 92 (or the protrusions) may be referred to as domain dividers.

The LCD according to an exemplary embodiment of the present invention can include the architecture illustrated in FIG. 4B, and also include other elements, such as a polarizing plate and a backlight assembly. A polarizing plate may be installed on either side of the architecture in such a manner that a first transmission axis is parallel to the gate line 22 and a second transmission axis is perpendicular to the gate line 22.

In the LCD according to an exemplary embodiment of the present invention, a liquid crystal in each of a plurality of domains of a pixel tilts perpendicularly to the gaps 83 or the cutouts 92 when an electric field is applied thereto. Thus, the liquid crystal in each of the domains forms an angle of about 45 degrees or −45 degrees with a transmission axis of a polarizing plate. A lateral electric field formed in each of the gaps 83 or the cutouts 92 facilitates the alignment of liquid crystal molecules in each domain.

A plurality of domains can be divided into, for example, 4 domain groups according to the direction in which a liquid crystal in each of the domains tilts. If the domain groups have the same area, it is possible to provide uniform vertical and horizontal visibility. The display characteristics of an LCD are determined mainly based on the second sub-pixel electrode 82b to which a voltage higher than a reference gray-scale voltage is applied. Therefore, if 4 domain groups constituting the second sub-pixel electrode 82b have substantially the same area, it is possible to provide uniform vertical and horizontal visibility. An LCD according to an exemplary embodiment of the present invention, which is capable of providing uniform vertical and horizontal visibility, will be described in detail with reference to FIG. 5.

Figure 5:
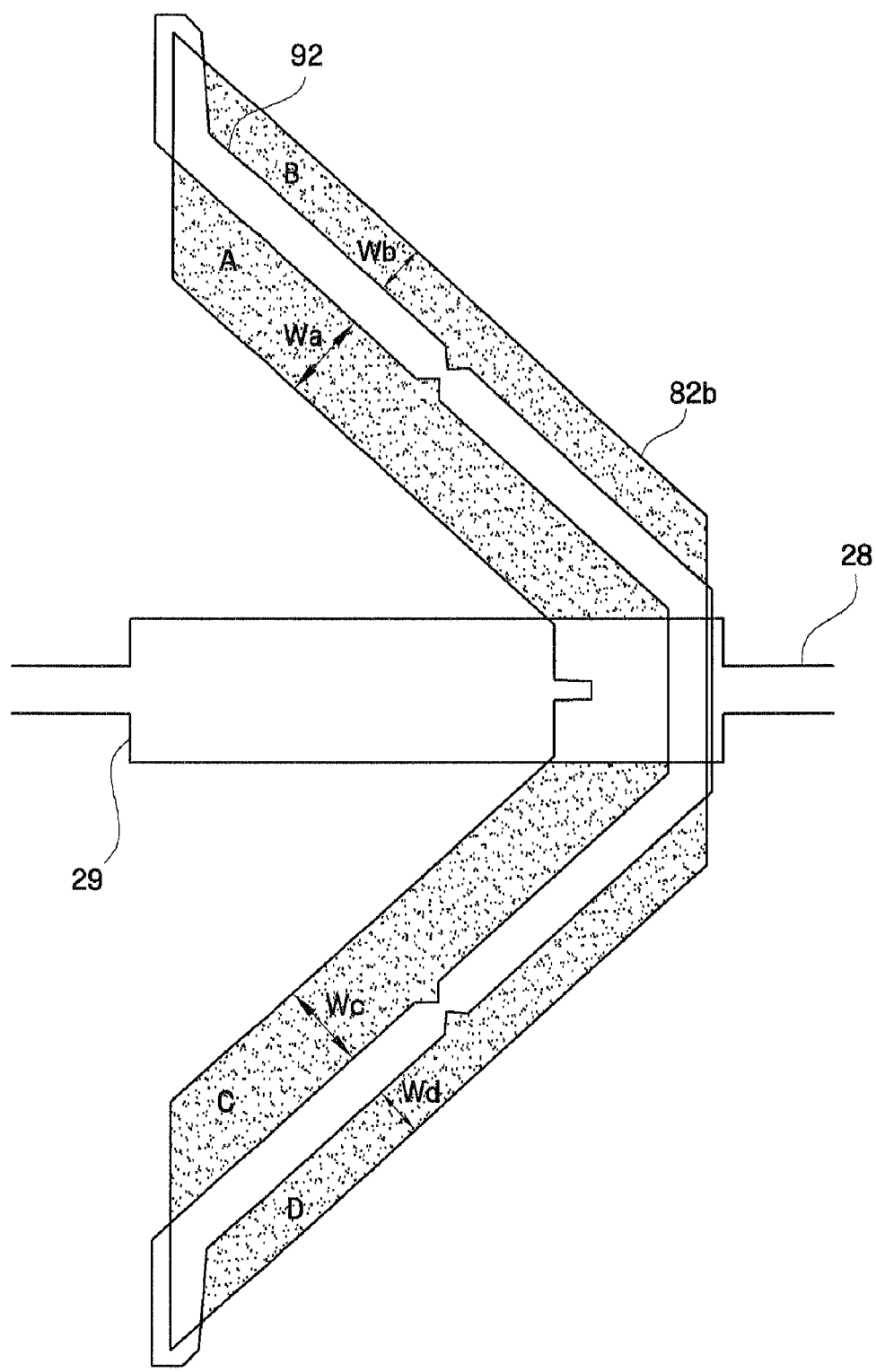
FIG. 5 is an enlarged layout view of a sub-pixel electrode of FIG. 4C.

FIG. 5 is an enlarged layout view of a second sub-pixel electrode of FIG. 4C.

Referring to FIG. 5, portions of a second sub-pixel electrode 82b are symmetrical with respect to a storage electrode line 28 which runs across the middle of the second sub-pixel electrode 82b. The second sub-pixel electrode 82b is separated from the first sub-pixel electrodes 82a of FIG. 4C by the gaps 83 of FIG. 4C. The second sub-pixel electrode 82b is V-shaped and is located in the middle of a pixel region. A cutout 92 is formed in a portion of the common electrode corresponding to the second sub-pixel electrode 82b. In other words, as shown in FIG. 5, the cutout 92 overlaps with the second sub-pixel electrode 82b, is V-shaped, and is narrower than the second sub-pixel electrode 82b. Therefore, the second sub-pixel electrode 82b can be divided into 4 domain groups, i.e., A, B, C, and D, by the storage electrode line 28, the gaps 83 and a domain divider, such as the cutout 92.

If the second sub-pixel electrode 82b is formed such that upper and lower oblique portions of the second sub-pixel electrode 82b are symmetrical with respect to the storage electrode line 28, the domain groups A and C may have substantially the same area, and the domain groups B and D may have substantially the same area. The upper oblique portions of the second sub-pixel electrode 82b form an angle of −45 degrees with a transmission axis of a polarizing plate, and the lower oblique portions of the second sub-pixel electrode 82b form an angle of 45 degrees with the transmission axis of the polarizing plate. Thus, in order to result in the domain groups A and B having the same area, the width Wa of the domain group A must be larger than the width Wb of the domain group B. Likewise, in order to result in the domain groups C and D having the same area, the width Wc of the domain group C must be larger than the width Wd of the domain group D. Here, the domain groups A and C of the second sub-pixel electrode 82b are arranged between the cutout 92 of the common electrode and the center of the pixel region. In this manner, the domain groups A, B, C, and D have the same area.

In order to achieve a predetermined response speed when aligning liquid crystal molecules using domain dividers and a lateral field formed along a predetermined direction, the domain group A or C may be formed to have a width of about 28 μm or less.

In addition, the domain group B or D may be formed to have a width of about 14 μm or larger in consideration of alignment margins for upper and lower display panels.

The operation of the LCD according to an exemplary embodiment of the present invention will now be described in detail with reference to FIGS. 1A through 4C.

Referring to FIGS. 1A through 4C, the signal control unit 600 receives input image signals (R, G, B) and input control signals to control the display of the input image signals. The input control signals include, for example, a vertical synchronization signal Vsync, a horizontal synchronization signal Hsync, a main clock signal MCLK, and a data enable signal DE. The input image signals and the input control signals are received from an external graphic controller (not shown). The signal control unit 600 appropriately processes the input image signals and the input control signals according to the operating conditions of the liquid crystal panel assembly 300, and generates a gate control signal CONT1 and a data control signal CONT2. The signal control unit 600 transmits the gate control signal CONT1 to the gate driving unit 400 (or the gate driving units 400a and 400b), and transmits the data control signal CONT2 to the data driving unit 500.

The gate control signal CONT1 comprises a scanning initiation signal STV for initiating scanning and at least one clock signal for controlling when to output the gate-on voltage Von. The gate control signal CONT1 may also include an output enable signal OE for defining the duration of the gate-on voltage Von. Here, the clock signal included in the gate control signal CONT1 may be used as a selection signal SE.

The data control signal CONT2 comprises a horizontal synchronization signal STH for informing the data driver 500 of a start of data transmission for a group of pixels, a load signal LOAD for instructing the data driver 500 to apply the data voltages to the data lines $D_1$ through $D_m$, and a data clock signal HCLK. The data control signal CONT2 may also include an inversion signal RVS for reversing the polarity of the data voltages with respect to the common voltage Vcom.

In response to the data control signal CONT2 transmitted by the signal control unit 600, the data driving unit 500 receives image data DAT for a pair of sub-pixels PXa and PXb, selects a gray-scale voltage for the image data DAT, converts the image data DAT into a data voltage, and applies the data voltage to one of the data lines $D_1$ through $D_m$ corresponding to the sub-pixels PXa and PXb.

The gate driving unit 400 (or the gate driving units 400a and 400b) applies the gate-on voltage Von to one of the gate lines $G_{1a}$ through $G_{na}$ and $G_{1b}$ through $G_{nb}$ corresponding to the sub-pixels PXa and PXb, so that switching devices Qa and Qb connected to the gate line to which the gate-on voltage Von is applied are turned on. Accordingly, the data voltage applied via the data line corresponding to the sub-pixels PXa and PXb is applied to the sub-pixels PXa and PXb via the switching devices Qa and Qb.

A difference between the data voltage applied to the sub-pixels PXa and PXb and the common voltage Vcom is represented as a voltage across the LC capacitor Clca, which is referred to as a pixel voltage. Liquid crystal molecules in the LC capacitor Clca have orientations depending on a magnitude of the pixel voltage, and molecular orientations of the LC molecules determine a polarization of light passing through the LC layer. A polarizer(s) converts light polarization into a light transmittance.

In the LCD according to an exemplary embodiment of the present invention, a gate voltage is transmitted to the sub-pixels PXa and PXb by a pair of gate lines 22a and 22b. A pair of gray-scale voltage sets, which have different gamma curves for the sub-pixels PXa and PXb obtained from a piece of image information, are applied to the sub-pixels PXa and PXb. Thus, a gamma curve for a pixel PX comprising the sub-pixels PXa and PXb can be obtained by synthesizing the gamma curves for the sub-pixels PXa and PXb. It is possible to improve lateral visibility by determining gray-scale voltages for the respective sub-pixels PXa and PXb so that a synthesized gamma curve obtained from the front of an LCD is similar to a reference gamma curve for the front of the LCD and a synthesized gamma curve obtained from either side of the LCD is as close as possible to the reference gamma curve.

In addition, as described above, 4 domain groups constituting the second sub-pixel electrode 82b are formed to have substantially the same area, thereby resulting in uniform vertical and horizontal visibility.

Figure 6A:
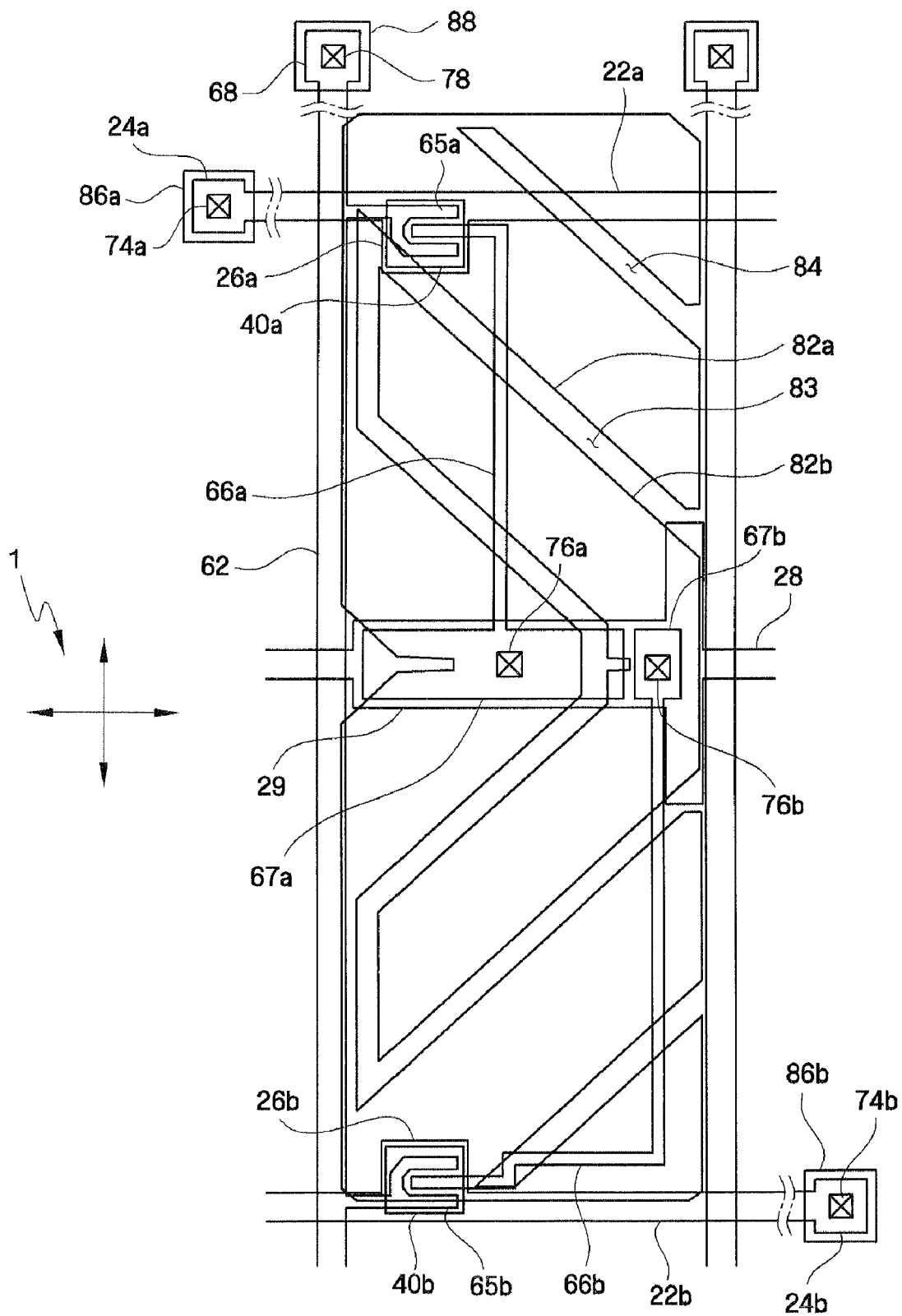
FIG. 6A is a layout view of a lower display panel of an LCD according to another exemplary embodiment of the present invention.
Figure 6B:
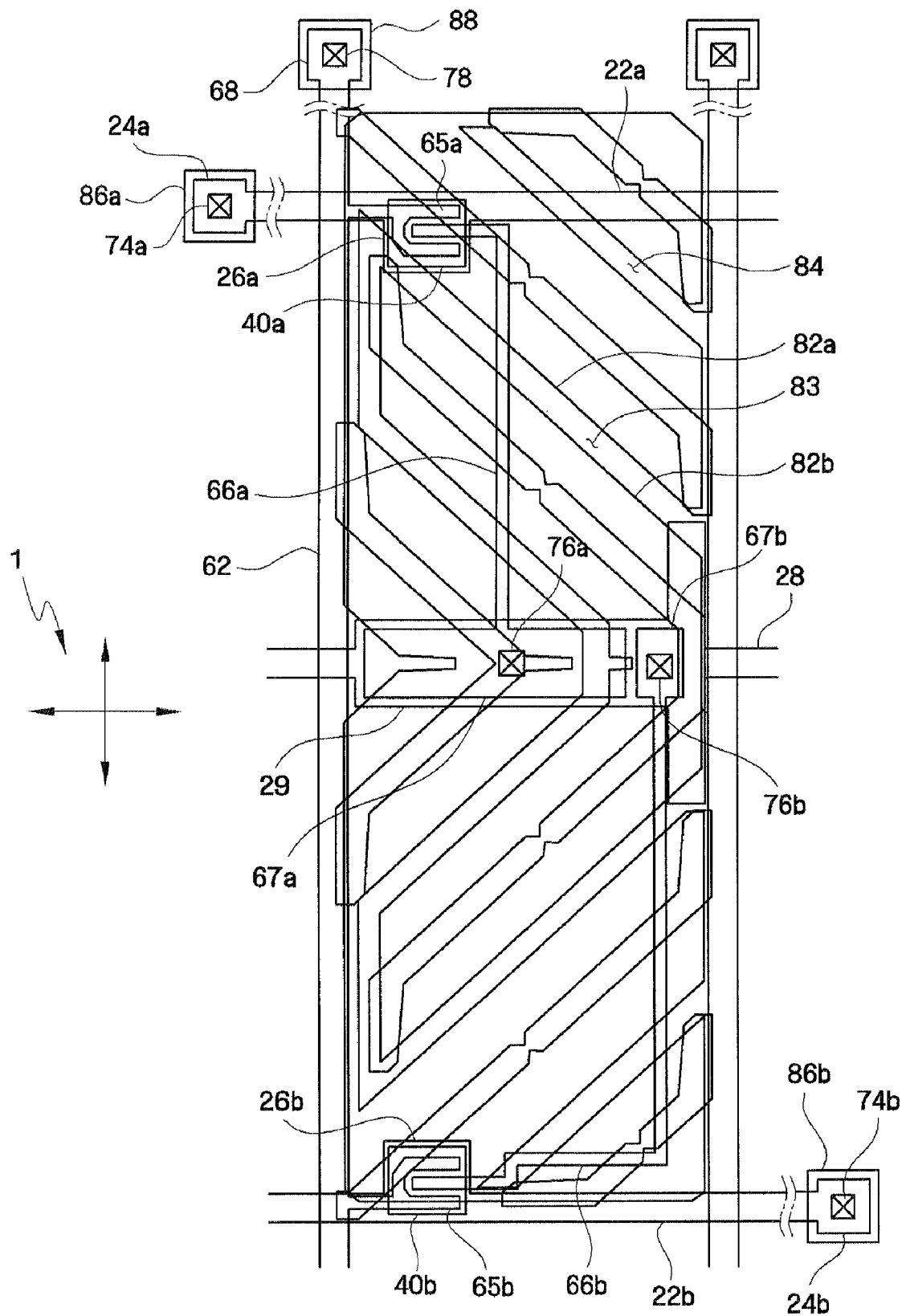
FIG. 6B is a layout view of an LCD including an upper display panel and the display panel of FIG. 6A according to another exemplary embodiment of the present invention.
Figure 7:
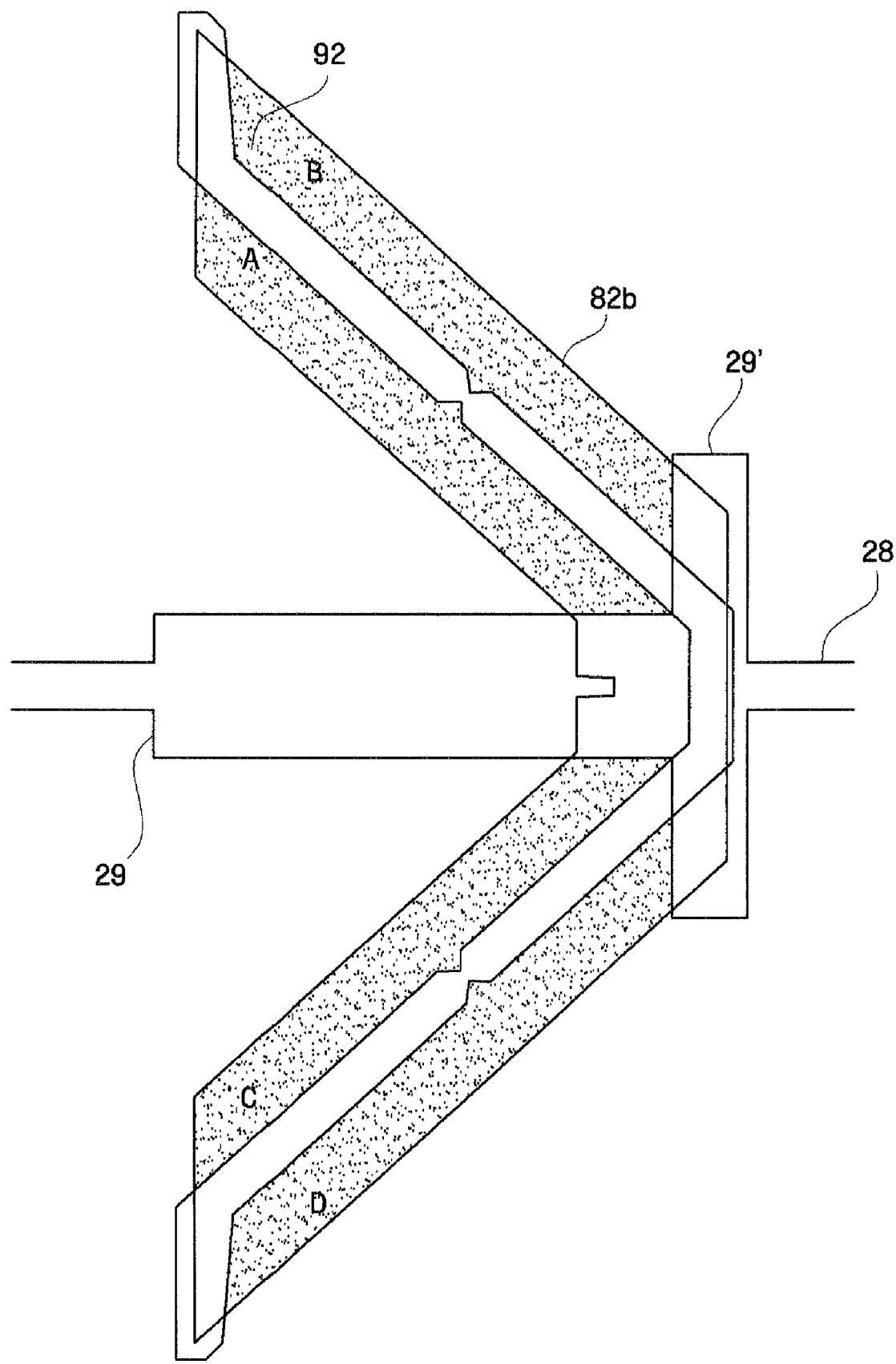
FIG. 7 is an enlarged layout view of a sub-pixel electrode of FIG. 6B.

An LCD according to another exemplary embodiment of the present invention will now be described in detail with reference to FIGS. 6A through 7. Components having the same function as described in connection with the embodiments shown in FIGS. 1 through 5 are respectively identified by the same reference numerals, and their further description will be omitted. FIG. 6A is a layout view of a lower display panel of an LCD according to another exemplary embodiment of the present invention. FIG. 6B is a layout view of an LCD including an upper display panel and the lower display panel of FIG. 6A according to another exemplary embodiment of the present invention. FIG. 7 is an enlarged layout view of a second sub-pixel electrode of FIG. 6B.

Referring to FIG. 7, the LCD is substantially the same as the LCD according to the embodiment of the present invention described in connection with FIGS. 4A-4C and 5, except that, 4 domain groups constituting a second sub-pixel electrode 82b, i.e., domain groups A, B, C, and D, are formed to have substantially the same width. Accordingly, the area of domain group B or D is larger than the area of domain groups A or C. Therefore, in order to make the domain groups A, B, C, and D have substantially the same area, a storage electrode extension 29' may be formed such that it extends from the storage electrode 29 in directions of the domain groups B and D. In other words, the storage electrode extension 29' extends toward the domain groups B and D adjacent to the storage electrode 29 so as to be overlapped with the second sub-pixel electrode 82b, thereby reducing the areas of the domain groups B and D.

In the present embodiment, the storage electrode 29 having the storage electrode extension 29' is formed as a rotated 'T' shape. However, the shape formed by the storage electrode 29 and the storage electrode extension 29' is not restricted to the shape shown. In other words, the storage electrode 29 and the storage electrode extension 29' may be formed in various shapes as long as the domain groups A, B, C, and D have the same area.

As described above, it is possible to provide uniform vertical and horizontal visibility by forming the 4 domain groups of the second sub-pixel electrode 82b divided according to orientations of liquid crystal molecules so as to have the same area.

Accordingly, the embodiments of the present invention provide uniform visibility in horizontal and vertical directions while improving lateral visibility.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:
1. A liquid crystal display (LCD) device comprising:
a first insulating substrate comprising a plurality of pixel electrodes;
a second insulating substrate comprising a common electrode and domain dividers;

a liquid crystal layer interposed between the first and the second insulating substrates, wherein at least one of the pixel electrodes is to be divided into at least a first domain and a second domain by one of the domain dividers of the second insulating substrate, the first and second domains have different widths and lengths from each other, and have substantially the same area with each other.

2. The LCD device of claim 1, wherein each of the domains has a width of 28µm or less.

3. The LCD device of claim 1, wherein each of the domains has a width of 14µm or more.

4. The LCD device of claim 1, wherein the first domain and the second domain have a trapezoid shape.

5. The LCD device of claim 1, wherein the domain dividers include oblique portions.

6. The LCD device of claim 5, wherein the oblique portions form an angle of −45 degrees or 45 degrees with a transmission axis of a polarizing plate.

7. The LCD device of claim 5, wherein domain dividers have a substantially straight line shape.

8. The LCD device of claim 1, further comprising a storage electrode line, wherein the domain dividers are symmetrical with respect to the storage electrode line.

9. The LCD device of claim 8, further comprising a storage electrode, wherein the storage electrode and the storage electrode line are formed in the same layer.

10. The LCD device of claim 9, wherein the storage electrode includes a storage electrode extension being wider than the storage electrode line.

11. The LCD device of claim 10, wherein the storage electrode including the storage electrode extension has a substantially "T"-shape.

12. The LCD device of claim 1, wherein a pixel electrode of the plurality of pixel electrodes includes a plurality of protrusions.

13. The LCD device of claim 10, wherein the storage electrode extension is extended vertically to the storage line.

14. The LCD device of claim 13, wherein the storage electrode including the storage electrode extension has a substantially "T"-shape.

15. A liquid crystal display device comprising:

a first insulating substrate comprising a plurality of pixel electrodes;

a second insulating substrate comprising a common electrode and domain dividers;

a liquid crystal layer interposed between the first and the second insulating substrates;

wherein at least one of the pixel electrodes is to be divided into first to fourth domains by at least one of the domain dividers of the second insulating substrate, the first and the third domains have a first width and a first length, and the second and the fourth domains have a second width different from the first width and a second length different from the first length, and wherein the first to fourth domains have substantially the same area with one another.

16. The LCD of claim 15, wherein the first insulating substrate further comprises:

a storage electrode line passing through a pixel region; and a storage electrode connected to the storage electrode line, wherein the first and the third domains are symmetrical with respect to the storage electrode, and the second and the fourth domains are symmetrical with respect to the storage electrode.

17. The LCD device of claim 16, wherein the storage electrode includes a storage electrode extension being wider than the storage electrode line.

18. The LCD device of claim 17, wherein the storage electrode extension is extended vertically to the storage line.

19. The LCD device of claim 18, wherein the storage electrode including the storage electrode extension has a substantially "T"-shape.

20. The LCD device of claim 15, wherein the first domain and the second domain have a trapezoid shape.

21. The LCD device of claim 15, wherein the domain dividers include oblique portions.

22. The LCD device of claim 21, wherein the oblique portions form an angle of −45 degrees or 45 degrees with a transmission axis of a polarizing plate.

23. The LCD device of claim 15, wherein a pixel electrode of the plurality of pixel electrodes includes a plurality of protrusions.

* * * * *